United States Patent
Kim et al.

(10) Patent No.: US 9,070,956 B2
(45) Date of Patent: Jun. 30, 2015

(54) BATTERY ASSEMBLY

(71) Applicants: JungMin Kim, Suwon (KR); Jinwook Seo, Suwon (KR); Junghoon Chae, Suwon (KR)

(72) Inventors: JungMin Kim, Suwon (KR); Jinwook Seo, Suwon (KR); Junghoon Chae, Suwon (KR)

(73) Assignees: AAC ACOUSTIC TECHNOLOGIES (SHENZHEN) CO., LTD., Shenzhen (CN); AAC ACOUSTIC TECHNOLOGIES (CHANGZHOU) CO., LTD., Changzhou (CN)

( * ) Notice: Subject to any disclaimer, the term of this patent is extended or adjusted under 35 U.S.C. 154(b) by 363 days.

(21) Appl. No.: 13/732,419

(22) Filed: Jan. 1, 2013

(65) Prior Publication Data

US 2013/0171479 A1      Jul. 4, 2013

(30) Foreign Application Priority Data

Jan. 4, 2012 (CN) .......................... 2012 1 0000279

(51) Int. Cl.
| | |
|---|---|
| H01M 10/42 | (2006.01) |
| H01Q 1/24 | (2006.01) |
| H01Q 7/00 | (2006.01) |
| H04M 1/02 | (2006.01) |

(52) U.S. Cl.
CPC ............. *H01M 10/425* (2013.01); *H01Q 1/243* (2013.01); *H01Q 7/00* (2013.01); *H04M 1/0262* (2013.01)

(58) Field of Classification Search
CPC .. H01M 10/425; H01M 1/0262; H01Q 1/243; H01Q 7/00
See application file for complete search history.

(56) References Cited

U.S. PATENT DOCUMENTS

| | | | | |
|---|---|---|---|---|
| 2009/0061933 | A1* | 3/2009 | Lo et al. ......................... | 455/558 |
| 2014/0125538 | A1* | 5/2014 | Kanj et al. .................... | 343/788 |

FOREIGN PATENT DOCUMENTS

WO     WO 2012174634 A1 * 12/2012

* cited by examiner

*Primary Examiner* — Basia Ridley
*Assistant Examiner* — Heng Chan
(74) *Attorney, Agent, or Firm* — Anova Law Group PLLC

(57) ABSTRACT

Disclosed is a battery assembly. The battery assembly includes a battery, a front cover enclosing a front end of the battery, a back cover enclosing a back end of the battery and an antenna assembled with the battery. The battery includes a core, and includes a top surface, a bottom surface and a side surface connecting the top surface and the bottom surface. The antenna includes a first output end and a second output end attached to the side surface of the battery, and a loop extending from the first and second output ends.

13 Claims, 7 Drawing Sheets

BATTERY ASSEMBLY

FIELD OF THE INVENTION

The present invention generally relates to the field of batteries, and more particularly to a battery assembly with a communication antenna used in a mobile communication device.

DESCRIPTION OF RELATED ART

In order to reduce the size of a mobile phone, the communication antenna, such as a coil, is configured to be positioned with the battery used therein. A battery assembly related to the present disclosure includes a battery and a loop-shaped antenna attached to an outer surface of the battery. The loop-shaped antenna is wound by a conductive coil. The antenna includes a first terminal, a loop extending from the first terminal, and a second terminal extending from the loop. With the increase of the turn number of the loop, the distance between the first and second terminals is accordingly increased, which makes it more difficult to solder the terminals to exterior circuits.

Therefore, an improved battery assembly is desired to solve the problem mentioned above.

Figure 1:
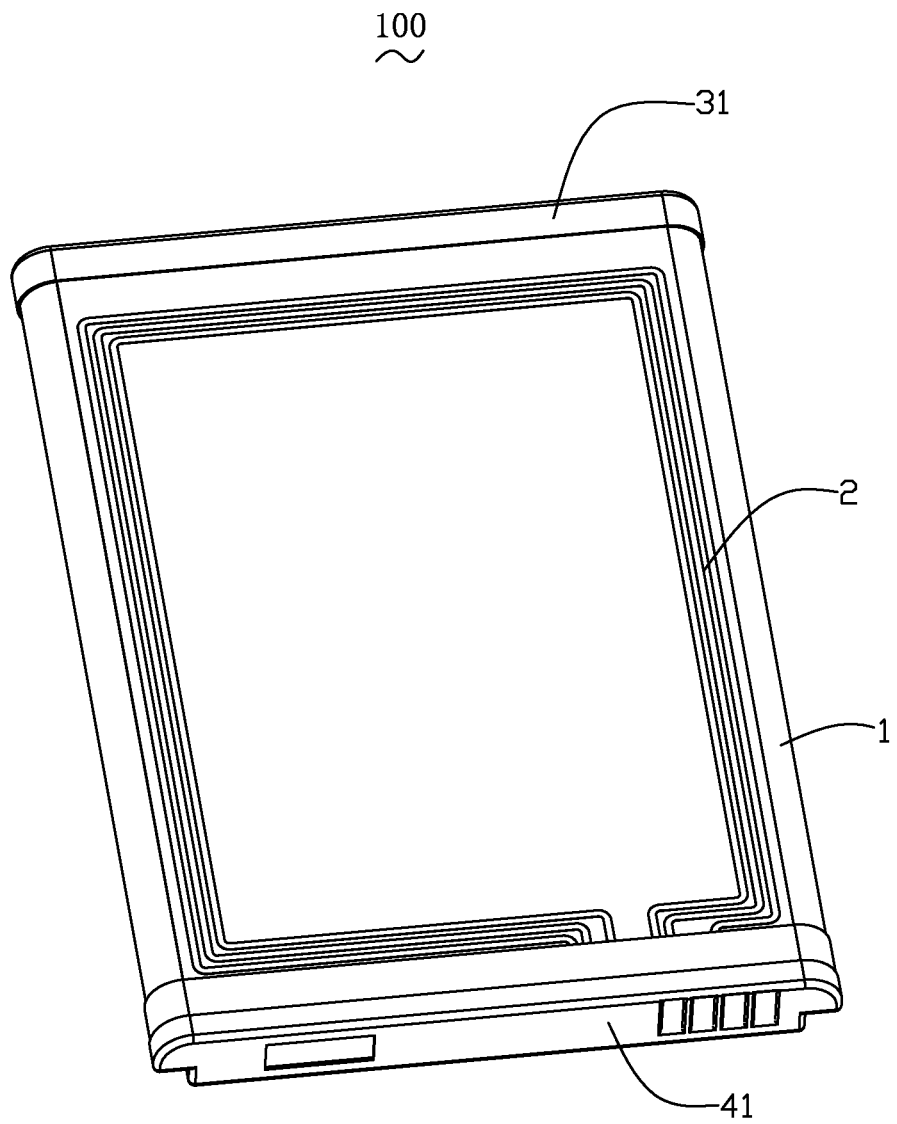
FIG. 1 is a schematic isometric view of a battery assembly in accordance with an exemplary embodiment of the present invention.

Many aspects of the embodiment can be better understood with reference to the drawings mentioned above. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

An exemplary embodiment of the present disclosure will be described in detail as follows.

Figure 2:
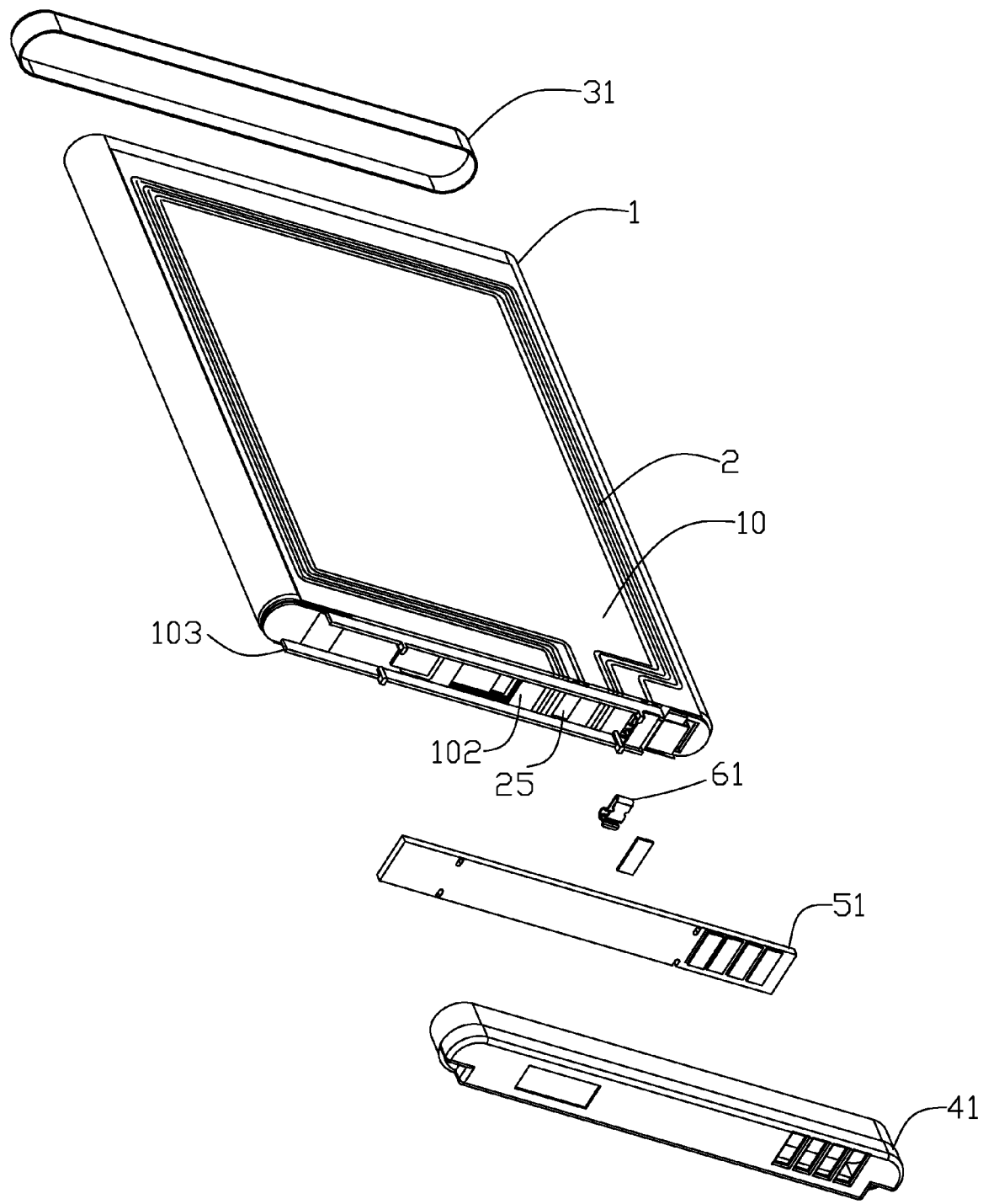
FIG. 2 is a separate view of a battery and an auxiliary member in FIG. 1.
Figure 3:
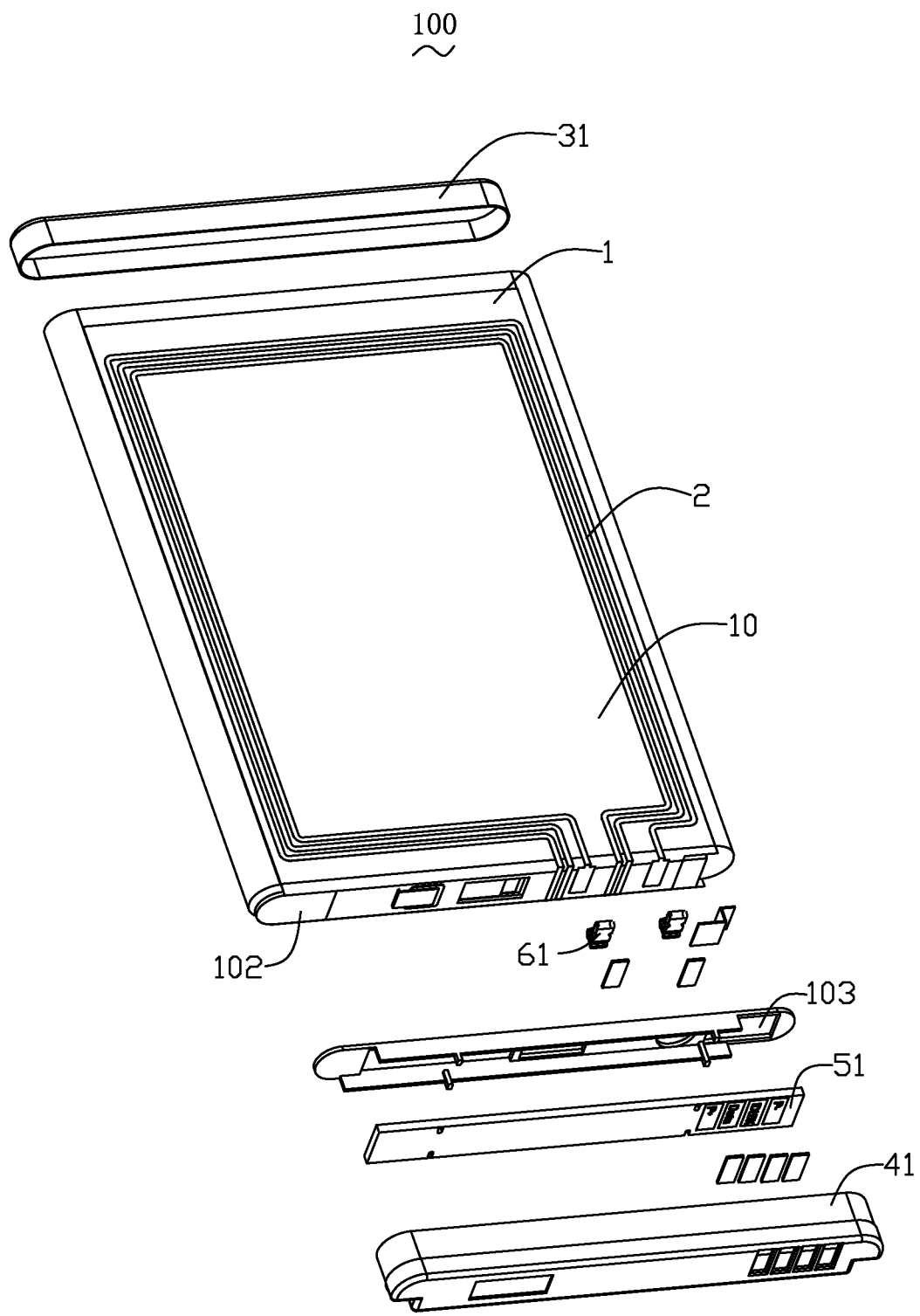
FIG. 3 is an exploded view of the battery assembly in FIG. 1.
Figure 4:
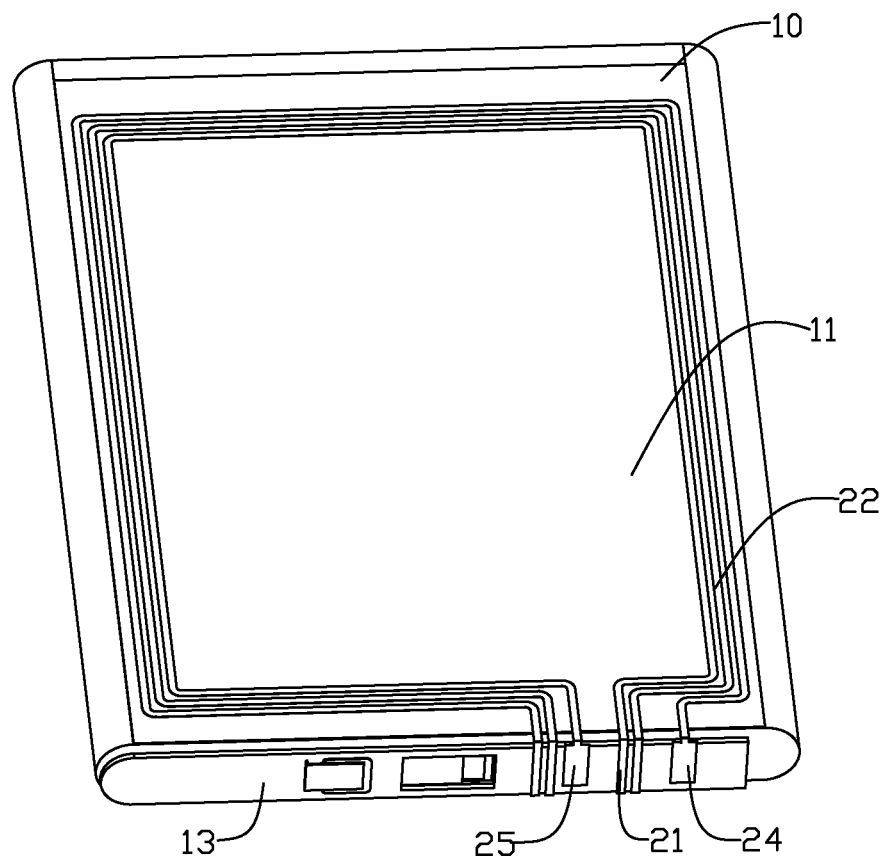
FIG. 4 is an assembled view of the battery and a loop-shaped antenna of the battery assembly of the present disclosure.
Figure 5:
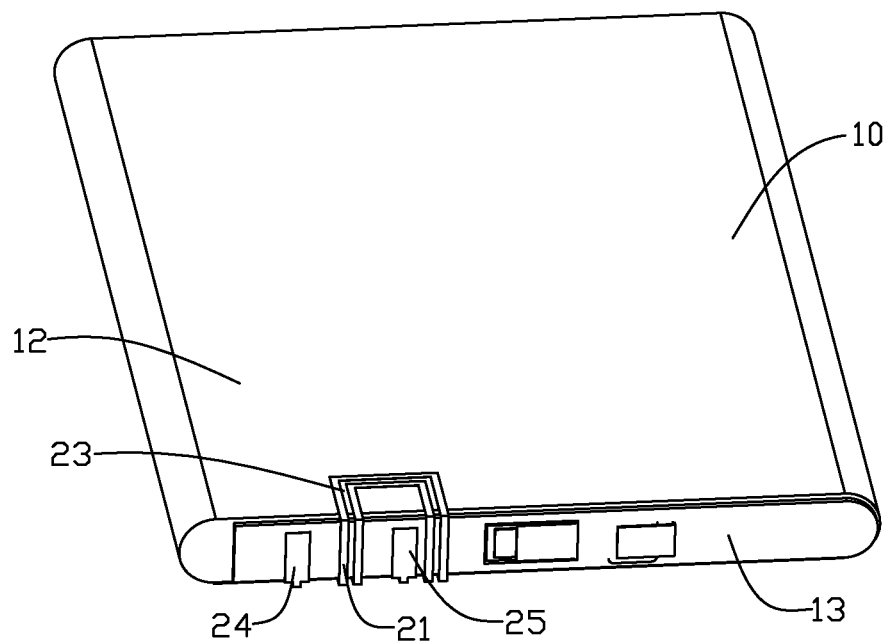
FIG. 5 is an assembled view of a connecting member and the loop-shaped antenna of the battery assembly of the present disclosure.
Figure 6:
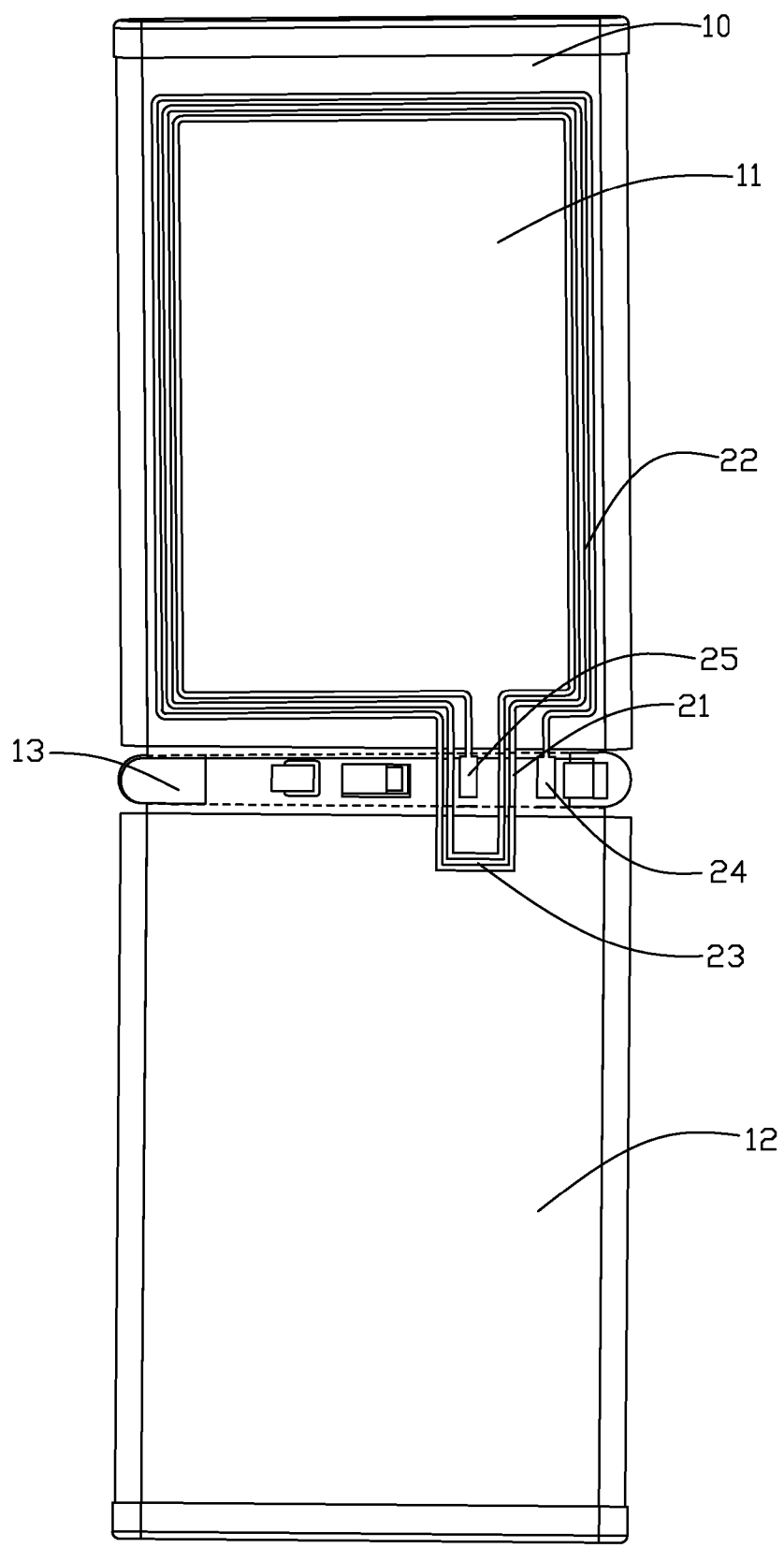
FIG. 6 is an expanded view of the loop-shaped antenna ready to be assembled with the battery.
Figure 7:
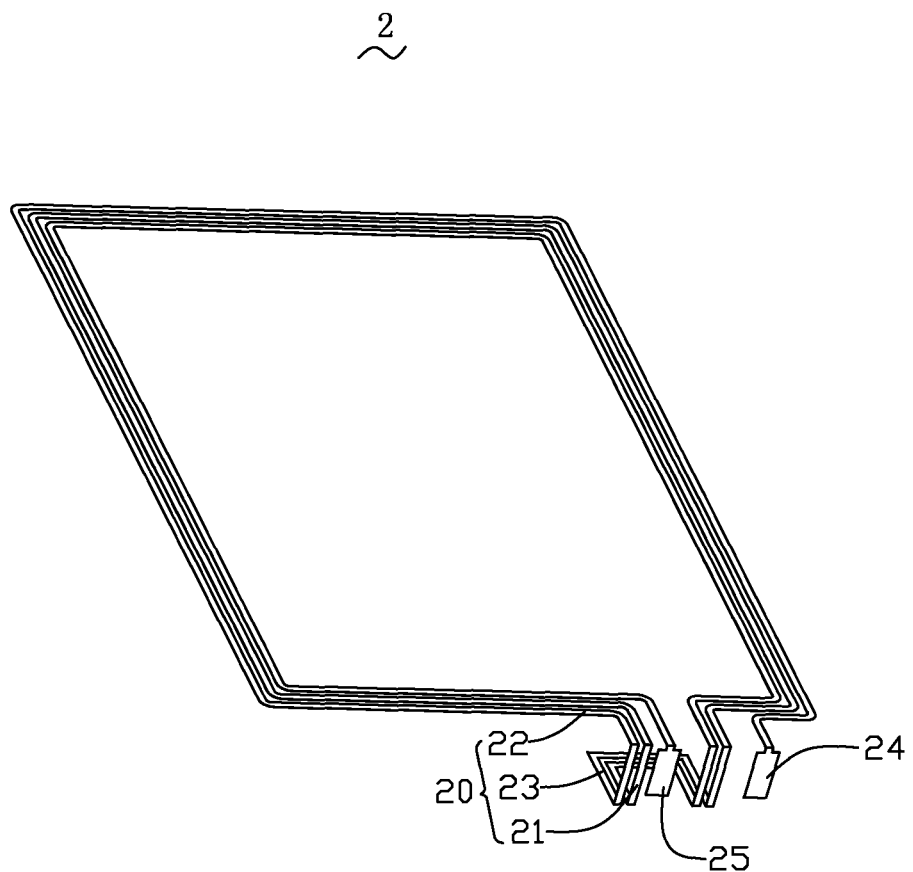
FIG. 7 is an isometric view of the loop-shaped antenna of the present disclosure.

Referring to FIGS. 1-3, a battery assembly 100 in accordance with an exemplary embodiment of the present disclosure includes a battery 1, an auxiliary member connecting with the battery 1, and a loop-shaped antenna 2 attached with the battery 1.

The battery 1 includes a core 10, a connecting member 102 located on one side of the core 10. In this embodiment, the connecting member 12 is a double-side adhesive plate, and the battery 1 further includes a frame 103 located between the core 10 and the connecting member 102.

The auxiliary member includes a circuit board 51 located on one side of the connecting member 12, terminals 61, a front cover 41 enclosing a front end of the battery 1, and a back cover 31 located on the other side of the connecting member 12 for enclosing a back end of the battery 1. The loop-shaped antenna 2 is wound by metallic coils and attached on a surface of the battery 1. The antenna 2 may be used for near field communication (NFC), Bluetooth, or other communication function.

Referring to FIGS. 4-7, the battery 1 includes a top surface 11, a bottom surface 12 opposite and parallel to the top surface 11, and a side surface 13 connecting the top and bottom surfaces 11,12 and facing to the circuit board 51. The side surface 13 is perpendicular to the top surface 11 and disposed at the front end of the battery 1.

The loop-shaped antenna 2 includes a first output end 24, a loop 20 extending from the first output end 24, and a second output end 25 extending from the loop 20. The first output end 24 and the second output end 25 are both located on the side surface 13 of the battery 1 for enabling the first and second output ends to be electrically connected to an external circuit easily. The loop 20 includes a first section 21, a second section 22, and a third section 23.

The first section 21 is a section located on the side surface 13 of the battery 1, the second section 22 is a section extending and bent from one end of the first section 21 and located on the top surface 11 of the battery 1, and the third section 23 is a section extending and bent from the other end of the first section 21 for being located on the bottom surface 12 of the battery 1. The first section 21 has a width smaller than the second section 22 and equal with the third section 23.

The circuit board 51 is located between the connecting member 102 and the front cover 41. The terminals 61 are located between the connecting member 102 and the circuit board 51, and are electrically connected to the first and second output ends 24, 25 of the antenna 2.

While assembled together, the second section 22 of the loop 20 is attached on the top surface 10 of the battery 1, the first section 21 is located on the side surface 13 of the battery 1, and the third section 23 is located on the bottom surface 12 of the battery 1, by which the antenna 2 is fixed with the battery 1 firmly. The first and second output ends 24, 25 are also located on the side surface 13 of the battery 1 for electrically connecting to the external circuit.

While the present disclosure has been described with reference to the specific embodiment, the description of the disclosure is illustrative and is not to be construed as limiting the disclosure. Various of modifications to the present disclosure can be made to the exemplary embodiment by those skilled in the art without departing from the true spirit and scope of the disclosure as defined by the appended claims.

What is claimed is:

1. A battery assembly, comprising:
    a battery including a top surface, a bottom surface and a side surface connecting the top surface and the bottom surface;
    an antenna including a first part attached to the side surface of the battery, a second part located on the top surface of the battery, a third part located on the bottom surface of the battery, and a pair of ends disposed on the side surface of the battery.
2. The battery assembly as described in claim 1 further comprising a front cover attached to a front end of the battery, and a back cover enclosing a back end of the battery.

3. The battery assembly as described in claim 1, wherein the battery includes a core, a connecting member located on one side of the core and a frame located between the core and the connecting member.

4. The battery assembly as described in claim 3 further comprising a circuit board located between the connecting member and the front cover.

5. The battery assembly as described in claim 1 further comprising a pair of terminals electrically connected to the pair of ends of the antenna.

6. A battery assembly, comprising:
a battery;
an antenna wound by a coil, comprising a first loop-shaped portion attached to a top surface of the battery, a second loop-shaped portion attached to a bottom surface of the battery and a pair of output ends located on a side surface of the battery, the side surface being perpendicular to the top surface.

7. The battery assembly as described in claim 6 further comprising a third portion connecting the first and second loop-shaped portions and disposed on the side surface of the battery.

8. A battery assembly, comprising:
a battery including a core, and including a top surface, a bottom surface and a side surface connecting the top surface and the bottom surface;
a front cover enclosing a front end of the battery, and a back cover enclosing a back end of the battery;
an antenna assembled with the battery, the antenna comprising a first output end attached to the side surface of the battery, a second output end attached to the side surface of the battery, and a loop extending from the first and second output ends; wherein
the loop includes a first section located on the side surface of the battery, a second section attached to the top surface of the battery, and a third section located on the bottom surface of the battery.

9. The battery assembly as described in claim 8, wherein the second section is disposed at a periphery of the top surface of the battery.

10. The battery assembly as described in claim 9, wherein the first section has a width smaller than the second section and equal with the third section.

11. The battery assembly as described in claim 8, wherein the battery further includes a connecting member located on one side of the core and a frame located between the core and the connecting member.

12. The battery assembly as described in claim 11 further comprising a circuit board located between the connecting member and the front cover.

13. The battery assembly as described in claim 12 further comprising terminals located between the connecting member and the circuit board, and electrically connected to the first and second output ends of the antenna.

\* \* \* \* \*